United States Patent [19]

Butler, III

[11] 4,300,066
[45] Nov. 10, 1981

[54] LEAKAGE MEASURING APPARATUS FOR A GAS-COOLED, LIQUID-COOLED, DYNAMOELECTRIC MACHINE

[75] Inventor: John M. Butler, III, Pittsburgh, Pa.

[73] Assignee: Westinghouse Electric Corp., Pittsburgh, Pa.

[21] Appl. No.: 21,528

[22] Filed: Mar. 19, 1979

[51] Int. Cl.³ .............................................. H02K 9/00
[52] U.S. Cl. ........................................ 310/53; 310/59; 73/40.5 R; 55/274; 55/309; 165/DIG. 24; 62/51; 62/424; 62/514 R
[58] Field of Search .................... 310/53, 57, 72, 54, 310/73, 58, 64; 73/40.5 R; 55/274, 309; 137/534; 165/37, 38, 70, DIG. 24; 62/51, 124, 514

[56] References Cited

U.S. PATENT DOCUMENTS

| | | | |
|---|---|---|---|
| 2,675,493 | 4/1953 | Grobel | 310/53 |
| 3,089,969 | 5/1963 | Wiedemann | 310/53 |
| 3,122,668 | 2/1964 | Cuny | 310/53 |
| 3,755,702 | 8/1973 | Willyoung | 310/53 |
| 3,822,389 | 7/1974 | Kudlacik | 310/53 |

FOREIGN PATENT DOCUMENTS

| | | | |
|---|---|---|---|
| 1097547 | 1/1961 | Fed. Rep. of Germany | 310/53 |
| 1156161 | 10/1963 | Fed. Rep. of Germany | 310/53 |
| 1319713 | 1/1963 | France | 310/53 |

Primary Examiner—R. Skudy
Attorney, Agent, or Firm—G. H. Telfer

[57] ABSTRACT

A leakage measuring apparatus and method is herein provided for a gas-cooled, liquid-cooled dynamoelectric machine's cooling system. The apparatus comprises: a liquid coolant reservoir; an integrating vessel; a flow restriction means such as an orifice, orifice covered by a porous membrane, or a needle valve; a pressure relief valve which is hydraulically connected between the liquid coolant reservoir and the integrating vessel; and means for gaging the pressure within the integrating vessel, said pressure indicative of the amount of leakage within the cooling system. The effect obtained by the gaging of the pressure in the integrating vessel is: (1) the integration of the pressure surges resulting from the intermittent activation of the pressure relief valve; and (2) the amplification, for gaging purposes, of the pressure changes in the reservoir, these changes caused by the existence of leakage.

2 Claims, 4 Drawing Figures

LEAKAGE MEASURING APPARATUS FOR A GAS-COOLED, LIQUID-COOLED, DYNAMOELECTRIC MACHINE

BACKGROUND OF THE INVENTION

1. Field of the Invention

This invention relates to a gas-cooled dynamoelectric machine, such as a turbogenerator, with a liquid cooled stator; and more particularly to an improved apparatus and method for detecting any leakage in the cooling system of said machine.

2. Description of the Prior Art

Effective cooling for turbogenerators has been obtained by utilizing a bifurcated cooling system. Various parts of the machine are cooled by circulating a pressurized gas coolant contained within the gas tight casing of the dynamoelectric machine. Still other parts of the machine are further cooled by a liquid coolant which is circulated in close heat transfer relation with the metal of the current carrying conductors; such as, with a coolant fluid passage disposed within the main ground insulation which electrically separates the copper conductor from the stator laminations. In this example the stator windings may be hollow, electrically conductive bars through which a water liquid coolant is circulated in a closed system. The gas coolant may be hydrogen gas.

Conventionally, the gas coolant within the frame of the machine is kept at a higher pressure than that of the liquid coolant used for the internally cooled stator windings. This pressure gradient between the two cooling systems makes it possible to detect a leak in the liquid system inside the generator. Should a leak develop, the gas enters the liquid coolant system rather than the liquid escaping from its conduit into other parts of the dynamoelectric machine. Leakage of liquid out of the hollow conductors cannot occur under normal operating pressures in such a coolant system due to the pressure gradient. It is therefore advisable to detect any increases in the presence of gas entrained in the liquid cooling system by a gas monitor and warning system.

U.S. Pat. No. 2,970,232, to Kilbourne, issued Jan. 31, 1961, discloses a pressurized liquid cooling system for a gas-cooled, liquid-cooled generator; that is, for a bifurcated cooling system similar to that discussed above. The Kilbourne patent generally recognizes that increasing the liquid coolant pressure will raise the boiling point of the liquid coolant in the system. However, the patent does not include a leak detection device.

In the aforementioned closed liquid cooling system, the boiling point of the liquid is raised by increasing the static pressure throughout the liquid coolant. This not only increases the heat removal capability of the coolant, it retards coolant boiling. Coolant boiling may block the liquid path through the conduit, resulting in further vaporization. One disadvantage of increasing the static pressure in the liquid cooling system is that it increases the possibility of failure in the liquid connector joints and hoses. The liquid should be pressurized sufficiently to increase the boiling point, while at the same time the liquid pressure must remain below that of the gas coolant.

Several leak detection devices have been patented. One type of detection system merely identifies the existence of the coolant gas in the liquid coolant reservoir.

U.S. Pat. No. 2,675,493, issued Apr. 13, 1954 to Grobel recognizes that a detection of the presence of gas in the liquid coolant, which is kept at a lower pressure than the gas coolant, indicates the presence of a leak in the coolant system.

U.S. Pat. No. 3,122,668, issued Feb. 25, 1964 to Cuny proposes another arrangement for indicating leakage between cooling systems of turbogenerators. Prior to this patent, it was known that the presence of hydrogen gas as an indication of a possible leak could be detected by withdrawing the gas from a suitable point along the cooling liquid circuit under vacuum and supplying it to a gas analyzer. Such an indicating system, however, was complicated and expensive due to the vacuum system. In the Cuny patent, the indication of leaks between the two cooling systems of the generator, i.e., between the hydrogen coolant and the oil (which is used as the liquid coolant), is effected by a manometer arranged to directly measure the pressure of the gas in the oil tank. As hydrogen gas penetrates into the coolant oil system, the gas pressure in the tank rises. The Cuny patent teaches that measurement of this pressure will indicate the existence of leakage.

Measurement of the pressure in the coolant reservoir is problematic. Since a certain amount of leakage can be expected during normal operation of the dynamoelectric machine, not all pressure increases indicate a developing serious condition. Furthermore, the earlier the warning of a developing serious condition, the more likely it can be minimized and corrected. A leakage warning system should therefore respond as quickly as possible to unexpected pressure increases. Unfortunately, this objective frequently is limited by the sensitivity of the detection system. The sensitivity, after all, must be such that it discounts the expected pressure increases.

A warning system which can inform the operator of an unhealthy situation developing in the generator may prevent serious leakage and allow for repair during planned outage such as during low power demand periods. Such a continuous monitoring system should be capable of sensitive metering, with rapid response time, of small, unexpected pressure changes in the coolant tank.

SUMMARY OF THE INVENTION

The present invention provides a sensitive leakage detection apparatus for the cooling system of a gas-cooled, liquid-cooled dynamoelectric machine. In combination with the coolant reservoir of said machine, the apparatus comprises: an integrating vessel; a flow restriction means, a gage to measure the pressure or other property of the gas within the vessel, and at least one pressure relief valve.

A first pressure relief valve is connected to the liquid coolant reservoir, maintaining the pressure therein below a set maximum. This is accomplished by actuation of the valve to its open position for relatively short periods of time whenever the pressure exceeds a predetermined point. The gas thus bled from the reservoir is thereafter introduced into an integrating vessel having a predetermined volume. The integrating vessel has an outlet connected to a flow restriction means. This limits the pressure within the vessel by permitting a continuous flow of gas from the vessel at a predictable rate. A pressure gage measures the pressure within the integrating vessel. As shall be discussed more fully below, the effect of the integrating vessel is to: (1) integrate the abrupt changes caused by actuation of the first pressure relief valve; (2) amplify, for gaging purposes, these minute changes in pressure within the reservoir; and (3) provide an economical, sensitive and convenient means for measuring pressure changes, and thereby indicate developing leakage problems.

BRIEF DESCRIPTION OF THE DRAWINGS

The objects and advantages of this invention will become apparent from reading the following detailed description in connection with the accompanying drawings, in which.

DESCRIPTION OF PREFERRED EMBODIMENT

Figure 1:
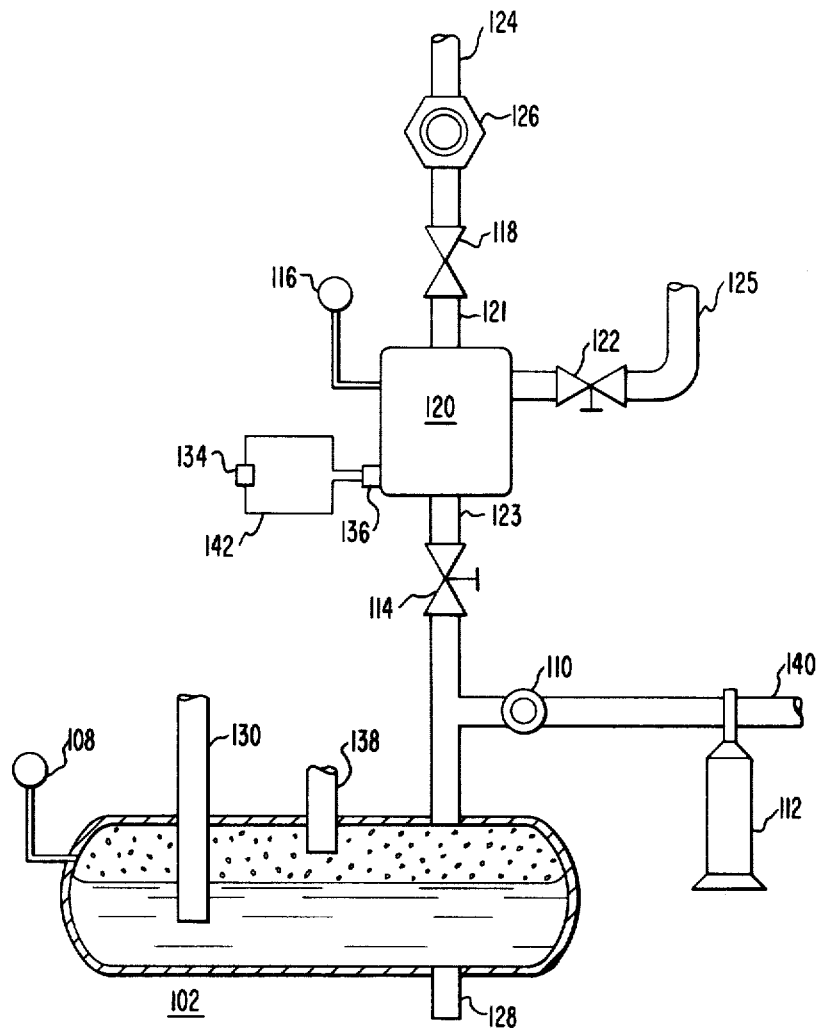
FIG. 1 is a schematic view of a leakage measuring apparatus constructed in accordance with one embodiment of the invention.

In accordance with the present invention, as diagrammatically shown in FIG. 1, an improved apparatus for measuring leakage in a dynomelectric machine's cooling system comprises at least one pressure relief valve 114; an integrating vessel 120 with a predetermined volume, said vessel 120 having therein an inlet 121 and an outlet 123; a flow restriction means 118 hydraulically connected to said outlet 123; a pressure gage 116; and a liquid coolant reservoir 102.

Operationally the coolant reservoir 102 serves as a holding tank for the liquid coolant. The liquid coolant, typically deionized water, is maintained within the reservoir 102 at a predetermined pressure by means of a pressurizing gas introduced into the liquid coolant reservoir 102 from a pressurizing gas supply 112. The object sought through the use of this gas is the minimization of the amount of oxygen that contacts the generator elements subject to corrosion. To this end, the liquid coolant is pressurized above atmospheric pressure by a non-oxidizing gas. For convenience, when hydrogen is used as the gas coolant, it is also frequently used as the pressurizing gas. Any leakage in the cooling system results in additional hydrogen seeping into the liquid coolant reservoir 102. Since this gas coolant is at a higher pressure than the fluid in the reservoir 102, the pressure within the reservoir 102 increases when leakage occurs. At a predetermined pressure, a first pressure relief valve 114 is actuated. Conventionally, the gas thereby released is vented off.

In accordance wth the present invention, however, the gas released from the reservoir 102 by the first pressure relief valve 114 flows into an integrating vessel 120 having a predetermined volume. This vessel 120 has an inlet 121 and an outlet 123. Hydraulically connected to the outlet 123 is a flow restriction means 118, such as a small orifice, an orifice covered by a porous membrane, or a needle valve. The flow restriction 118 means permits a continuous flow from the integrating vessel 120. The flow out of the vessel 120 proceeds through a first vent 124. For safety purposes a second pressure relief valve 122 connected to a second vent 125 may, if desired, be utilized to maintain the pressure within the integrating vessel 120 below a predetermined point. A pressure gage 116 measures the pressure within the integrating vessel 120. This pressure indicates the degree and amount of leakage occurring within the dynamoelectric machine, as shall be further discussed below.

Figure 2:
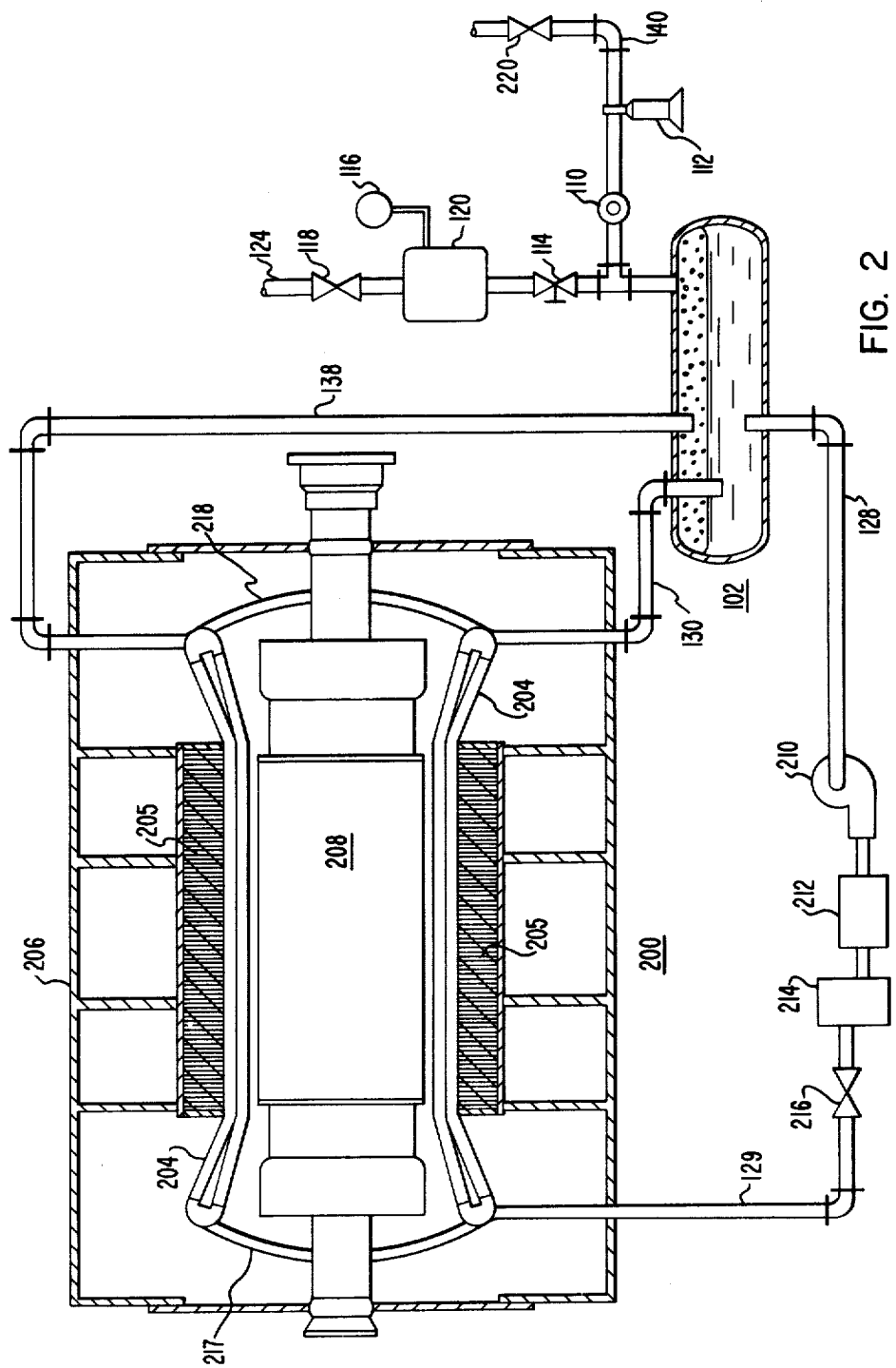
FIG. 2 is a schematic view in cross-section of a typical gas-cooled, liquid-cooled dynamoelectric machine together with a leakage measuring apparatus constructed in accordance with this invention.

To place this invention in perspective, it is necessary to describe the cooling system briefly discussed above. Referring to FIG. 2, a bifurcated cooling system for a dynamoelectric machine such as a large steam turbine-driven generator 200 is therein shown. Such a cooling system utilizes (1) a liquid coolant flowing through the hollow conductors of one feature of the generator 200, such as the stator winding 204; and (2) a gas coolant contained with the airtight frame 206 of the generator 200 that acts to cool its internal components, such as the stator laminations 205 and the rotor 208.

The flow path of the liquid coolant can be traced as follows: The liquid coolant is supplied from the reservoir 102 and is circulated throughout the liquid system by a pump 210. The liquid flows to the generator 200 through an inlet piping 128 and is discharged, from the generator 200 to the reservoir 102, through a discharge piping 130. The liquid system also typically includes a cooling means 212, such as a heat exchanger; a liquid coolant processor 214, including for example a filter and a demineralizer; and, if desired, at least one control valve 216. Within the generator 200 the liquid flows from the inlet piping 128 to an inlet manifold 217; then through a liquid-cooled component of the generator 200, such as the stator winding 204. From there it proceeds into a discharge manifold 218 to the discharge piping 130.

The gas coolant is typically, but not necessarily, supplied by the pressurizing gas supply 112 and flows to the generator 200 through a gas coolant supply pipe 140; said flow typically controlled by a gas regulator 220. The liquid coolant 104 is maintained at a pressure below that of the gas coolant. Upon the occurrence of a leak, the resulting pressure gradient causes the gas coolant to seep into the liquid coolant system. This gas coolant which enters the liquid coolant system is transported thereby to the reservoir 102. To facilitate this transport of the leaked gas, a leakage collector pipe 138 can be hydraulically connected between a relatively high point in the discharge manifold 218 and the reservoir 102. Typically, a certain amount of leakage can be expected to occur within the generator 202. When the leakage exceeds that amount, it may portend serious problems developing within the machine, if not indicate the already existence of those problems.

Employing an apparatus constructed in accordance with the invention, gas is intermittently released from the reservoir 102. It is released by the actuation of the first pressure relief valve 114 whenever the pressure in the reservoir 102 exceeds a preselected limit. The released gas enters the integrating vessel 120 through its inlet 121. The vessel 120 acts to contain the gas while at the same time it permits a continuous flow of gas to be bled off to the first vent 124 through the flow restriction means 118 hydraulically connected to the outlet 123 of the integrating vessel 120. The size of the integrating vessel 120 depends upon the uniformity of flow through the first pressure relief valve 114. The more uniform the flow, the smaller the volume of the vessel 120 need be. The uniformity of the flow depends upon both the characteristics of the valve 114 and of the gas 106 within the reservoir 102. In effect the integrating vessel 120 serves as a mechanical filter, eliminating higher frequency fluctuations in flow caused by the first pressure relief valve 114.

Figure 3:
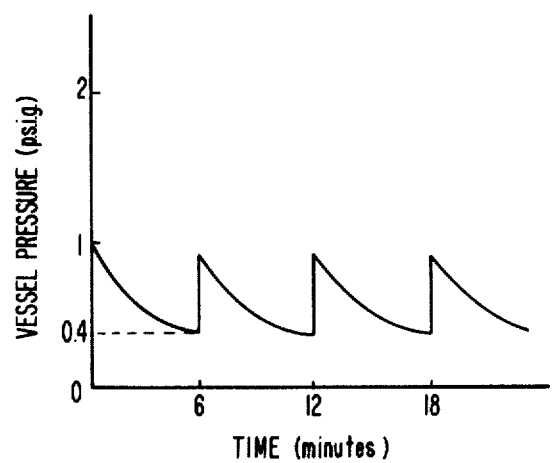
FIG. 3 is a graph in which vessel pressure is plotted against time for a typical turbogenerator protected by this invention.

With continued reference to FIG. 2, FIG. 3 is a graph depicting the pressure in the integrating vessel 120 as it changes with time. In deriving the graph one embodiment of the invention with typical operating characteristics was utilized. The reservoir's pressure, as measured by a reservoir gage 108 (FIG.1), was controlled by first pressure relief valve 114 which released the gas coolant, in this case hydrogen, whenever the pressure in the reservoir 102 exceeded 5 psig. The flow restriction means 118 utilized in FIG. 3 was an orifice having an effective opening of 0.0011 inches in diameter. The effective opening is the diameter of a circular orifice which provides the flow characteristics equivalent to those of the actual flow restriction means 118 utilized. (This shall be more fully discussed below.) A hydrogen pressure regulator 110 added additional hydrogen from a pressurizing gas supply 112 to the reservoir 102 whenever the pressure therein dropped below 2 psig. As long as there were no leaks of either the liquid coolant (in this case water) out of the liquid coolant system or of hydrogen into it, the pressure in the reservoir 102 should remain constant except for variations due to temperature changes. These variations due to temperature were not expected to vary the pressure beyond the 2 psig to 5 psig range. What was expected was a relatively small leak of 2 to 5 cubic feet per day diffused through the Teflon insulating hoses which supplied the water to the individual coils of the stator winding 204. A typical crack in any of the inner cooled copper coils, on the other hand, will leak at a much greater rate, such as 50 cubic feet per day. The volume of the reservoir 102 utilized was 20 cubic feet while that of the integrating vessel 120 was 5 cubic feet. For such a coolant system, a change in pressure in the reservoir 102 of 0.2 psig results in a change in the pressure in the integrating vessel 120 of approximately 0.6 psig each time hydrogen is released through the first pressure relief valve 114. This corresponds to a released volume of hydrogen of 0.2 cubic feet. For a leakage rate of 50 cubic feet per day, the pressure relief valve 114 will open every 6 minutes under these conditions.

In deriving FIG. 3, a thermal mass flow meter 126 was interposed between the flow restriction means 118 and the first vent 124. It served only to check pressure gage 108 and to calibrate its readings with gas leakage. Since the flow of gas through the flow restriction means 118 is relatively continuous, the needle of this flow meter 126 should not be subject to the abrupt fluctuations that could occur were the flow meter 126 connected directly to the first pressure relief valve 114.

A pressure sensitive switch 136, if desired, can be connected to the integrating vessel 120; said switch 136 is activated when the vessel pressure exceeds a predetermined limit. Upon the switch's actuation, it closes an external circuit 142 which energizes a visual or audio alarm 134. To mark a particularly dangerous condition in the generator, the switch 136 may also automatically interrupt the operation of the generator, as by triggering a circuit breaker. As an example, the switch 136 can be set to be actuated when the pressure in the integrating vessel 120 reaches 5 psig. This pressure corresponds to 16 psig in the reservoir 102 for those operating specifications discussed herein.

FIG. 3 can be further understood by reviewing the appropriate mathematical formula. When the first pressure relief valve releases hydrogen into the integrating vessel, the volume of gas released is approximately:

$$\Delta V = (\Delta P_R / P_R) V_R \qquad (1)$$

where:
$\Delta V$ ≡ volume of gas released
$V_R$ ≡ volume of reservoir
$P_R$ ≡ change of pressure in the reservoir
$P_R$ ≡ pressure in the reservoir where the change in the reservoir's pressure is the small reduction attributable to the opening of the first pressure relief valve. The incremental change in the integrating vessel's pressure is:

$$\Delta P_i = (\Delta V / V_i) P_i \qquad (2)$$

where:
$\Delta P_i$ ≡ change in vessel pressure
$P_i$ ≡ pressure in the integrating vessel
$V_i$ ≡ volume of the integrating vessel Substituting for the volume of gas released in equation (1) yields:

$$\Delta P_i = \Delta P_R (V_R / V_i)(P_i / P_R) \qquad (3)$$

Substituting the nominal values used in deriving FIG. 3 for the appropriate variables, produces a resulting change in pressure in the vessel of 3.2 times the change in pressure in the reservoir. Not only does the vessel effectively integrate the surges in pressure of the gas released by the first pressure relief valve, it also effectively amplifies the cumulative pressure changes.

One feature of the integrating vessel which is determinative of the pressure therein is the nature of the flow restriction means. As stated above, the means may be, for example, a simple orifice, an orifice covered by a porous membrane such as a porous rubber diaphragm, or a needle valve. In any case, the flow restriction means acts to permit only a predetermined flow out of the vessel.

The effective opening necessary to achieve the above-described changes in pressure in the integrating vessel can be computed mathematically. To simplify the calculations, assume that the vessel pressure is nearly constant. The diameter of the effective opening is given by the equation $$A = (L/K)(2[P_i/\rho])^{-\frac{1}{2}}$$

where
$L$ = flow rate
$\rho$ = density of hydrogen = $2 \times 10^{-13} \text{lb}_f - \text{sec}^2/\text{in}^4$
$K$ = 0.62

The diameter of the effective opening is therefore 0.0011 inches in order to maintain the pressure in the vessel below 1 psig at a flow rate of 50 cubic feet per day and a vessel pressure of 0.5 psig.

Figure 4:
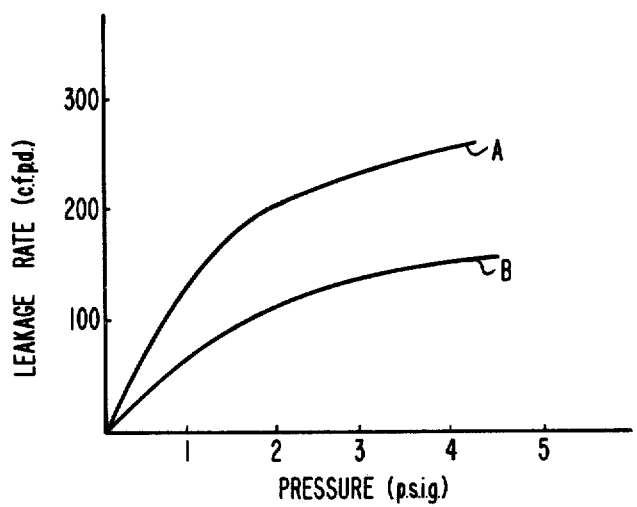
FIG. 4 is a graph in which leakage rate from the integrating vessel is separately plotted against vessel pressure for two flow restrictive means having differing effective openings.

FIG. 4 is a graph depicting the relationship between leakage rate in the coolant system and the vessel pressure. It is important to note that the required range and sensitivity of the pressure gage measuring the pressure in the integrating vessel can be predicted by the preselection of the appropriate effective opening through the flow restriction means. Curve A on the graph represents a flow restriction means with an effective opening of 0.0015 inches in diameter. It can be seen that, for this curve, leakage rates in the range of 50 to 300 cubic feet per day can be readily detected. Curve B corresponds to the expected characteristics from a flow restriction means with an effective opening of 0.0011 inches in diameter.

A method for measuring leakage in the coolant system of a gas-cooled, liquid-cooled dynamoelectric machine is also herein described. Referring once again to FIG. 1, the method includes the following steps: (a) Gas is intermittently released from a liquid coolant reservoir 102. This releasing step is performed whenever the pressure within the reservoir 102 exceeds a preselected limit. This can be accomplished by actuating a first pressure relief valve 114 to an open position. (b) The released gas is contained in an integrating vessel 120. (c) The gas in the integrating vessel 120 is continuously bled through a flow restriction means 118 having a predetermined effective opening. (d) The pressure within the integrating vessel is gaged. This pressure is indicative of the amount of leakage within the coolant system.

I claim:

1. In a dynamoelectric machine having a winding, a gas-tight frame surrounding said winding, and coolant means for circulating a liquid coolant within the winding and for maintaining a gas coolant, in thermal communication with the winding, at a pressure greater than that of the liquid coolant, a combination comprising:
   (1) a liquid-coolant system including a holding tank for said liquid-coolant, inlet means for supplying liquid coolant to said winding from said holding tank, and discharge means for returning said liquid-coolant to said holding tank; and
   (2) a leakage detection apparatus including
      (a) an integrating vessel of predetermined volume having an inlet end, an outlet end, and flow restriction means hydraulically disposed at said outlet end, said means establishing a generally continuous flow from said integrating vessel,
      (b) a first pressure relief valve hydraulically disposed between said holding tank and said integrating vessel, said valve operable to release a predetermined amount of gas from said holding tank to said integrating vessel whenever the pressure in the holding tank exceeds a predetermined level,
      (c) a pressure gage for measuring the pressure in the integrating vessel, said pressure indicative of the amount of leakage in the liquid coolant system, and
      (d) whereby said leakage detection apparatus acts to integrate the changes in pressure caused by the release of coolant by the first pressure relief valve, and to amplify for gaging purposes the pressure changes in the reservoir.

2. The combination of claim 1 further comprising a second pressure relief valve which maintains the pressure within the integrating vessel below a predetermined level.

* * * * *